US008877072B2

(12) United States Patent
Sahai et al.

(10) Patent No.: US 8,877,072 B2
(45) Date of Patent: Nov. 4, 2014

(54) THREE-DIMENSIONAL FRACTAL GRADUATED-BRANCHING HIERARCHICAL STRUCTURES AND FABRICATION METHOD THEREOF

(71) Applicants: Ranjana Sahai, Somerville, MA (US); Paolo Corradi, Noordwijk (NL)

(72) Inventors: Ranjana Sahai, Somerville, MA (US); Paolo Corradi, Noordwijk (NL)

( * ) Notice: Subject to any disclaimer, the term of this patent is extended or adjusted under 35 U.S.C. 154(b) by 37 days.

(21) Appl. No.: 13/647,725

(22) Filed: Oct. 9, 2012

(65) Prior Publication Data
US 2013/0087530 A1    Apr. 11, 2013

Related U.S. Application Data

(60) Provisional application No. 61/545,495, filed on Oct. 10, 2011.

(51) Int. Cl.
| | |
|---|---|
| *C23F 1/00* | (2006.01) |
| *B29C 59/02* | (2006.01) |
| *C03C 15/00* | (2006.01) |
| *C03C 25/68* | (2006.01) |
| *B29C 35/08* | (2006.01) |

(52) U.S. Cl.
CPC ............... *B29C 59/026* (2013.01); *B29C 59/02* (2013.01); *C03C 15/00* (2013.01); *B29C 2035/0811* (2013.01); *C03C 25/68* (2013.01)
USPC .................. 216/2; 216/99; 427/301; 427/364

(58) Field of Classification Search
USPC ................................ 216/2, 99; 427/301, 364
See application file for complete search history.

(56) References Cited

U.S. PATENT DOCUMENTS

| | | | |
|---|---|---|---|
| 5,633,972 A * | 5/1997 | Walt et al. ...................... 385/116 |
| 7,528,060 B1 | 5/2009 | Fonseca | |
| 7,875,536 B2 | 1/2011 | Samuelson | |
| 8,206,631 B1 | 6/2012 | Sitti | |
| 2006/0078725 A1 | 4/2006 | Fearing | |
| 2006/0202355 A1 | 9/2006 | Majidi | |
| 2010/0028604 A1 * | 2/2010 | Bhushan et al. .............. 428/156 |
| 2010/0084628 A1 * | 4/2010 | Lee et al. .......................... 257/9 |

FOREIGN PATENT DOCUMENTS

| | | |
|---|---|---|
| WO | 2004/050547 A2 | 6/2004 |
| WO | 2009/002644 A2 | 12/2008 |

OTHER PUBLICATIONS

Jeong et al. Langmuir, vol. 22, (2006), pp. 1640-1645.*
Yao et al. Journal of the Mechanics and Physics of Solids, vol. 54, (2006) pp. 1120-1146.*
Xiong Wen et al. Advanced Materials, vol. 20, (2008) pp. 3987-4019.*
Sun, et al., "Artificial lotus lead by nanocasting," Langmuir, vol. 21, 2005, pp. 8978-8981.

(Continued)

*Primary Examiner* — Lan Vinh
*Assistant Examiner* — Maki Angadi

(57) ABSTRACT

A method to fabricate a hierarchical graduated-branched structure that grows in a three-dimensional pattern down to fractal-branching, nano-size level is detailed. The fractal patterning is accomplished on a three-dimensional (i.e., non-planar) surface, by exposing the surface to a properly focused particle beam, which causes the spontaneous growth of graduated branches all over the surface. The structure can be fabricated with a single material and the fractal-patterning is done in a one step process. No addition of material is required for the formation of each branch. The fractal graduated branching structure can then be molded in order to produce replicas.

14 Claims, 4 Drawing Sheets

(56) References Cited

OTHER PUBLICATIONS

Bhushan, et al., "Micro-, nano- and hierarchical structures for superhydrophobicity, self-cleaning and low adhesion," Phil Trans R. Society A, vol. 367, 2009, pp. 1631-1672.

Jeong, et al. "Nanoengineered multiscale hierarchical structures with tailored wetting properties," Langmuir, vol. 22, 2006, pp. 1640-1645.

Mishchenko, et al., "Design of ice-free nanostructured surfaces based on repulsion of impacting water droplets," ACS Nano, vol. 4, 2010.

Autumn, et al., "Evidence for van der Waals adhesion in gecko setae," PNAS, vol. 99, No. 19, 2002, pp. 12252-12256.

Lee, et al., "Gecko-Inspired Combined Lamellar and Nanofibrillar Array for Adhesion on Nonplanar Surface," Langmuir, vol. 25, 2009, pp. 12449-12453.

Majidi, et al., "High friction from a stiff polymer using microfiber arrays," Phys. Rev. Letters, vol. 97, 2006, 076103 (4pp).

Dean, et al., "Shark-skin surfaces for fluid-drag reduction in turbulent flow: a review," Phil. Trans. R. Soc. A, vol. 368, 2010, pp. 4775-4806.

Zhu, et al., "Sonochemical fabrication of morpho-genetic $TiO_2$ with hierarchical structures for photocatalyst," J. Nanopart. Res., vol. 12, 2010, pp. 2445-2456.

Takei, et al., "Nanowire active-matrix circuitry for low-voltage macroscale artificial skin," Nature Materials, vol. 9, 2010, pp. 821-826.

Hoffmann, et al., "Comparison of mechanically drawn and protection layer chemically etched optical fiber tips," Ultramicroscopy, vol. 61, 1995, pp. 165-170.

Dirks, et al. "Mechanisms of fluid production in smooth adhesive pads of insects," J. R. Soc. Interface, vol. 8, 2011, pp. 952-960.

Persson, "Wet adhesion with application to tree frog adhesive toe pads and tires," J. Phys.: Condens. Matter, vol. 19, 2007, 376110 (16pp).

\* cited by examiner

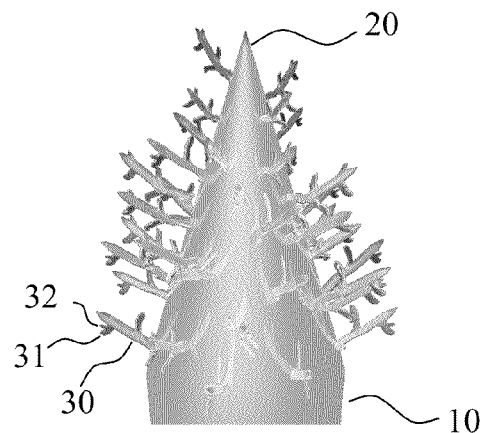
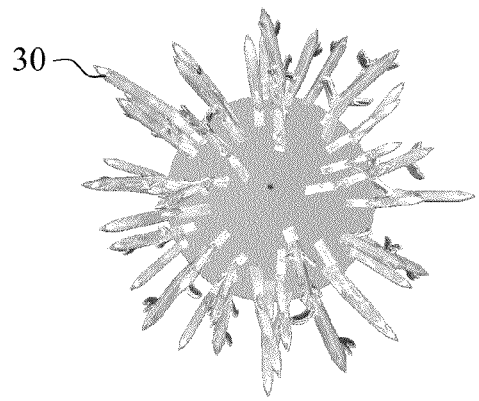
*FIG. 1a*  *FIG. 1b*
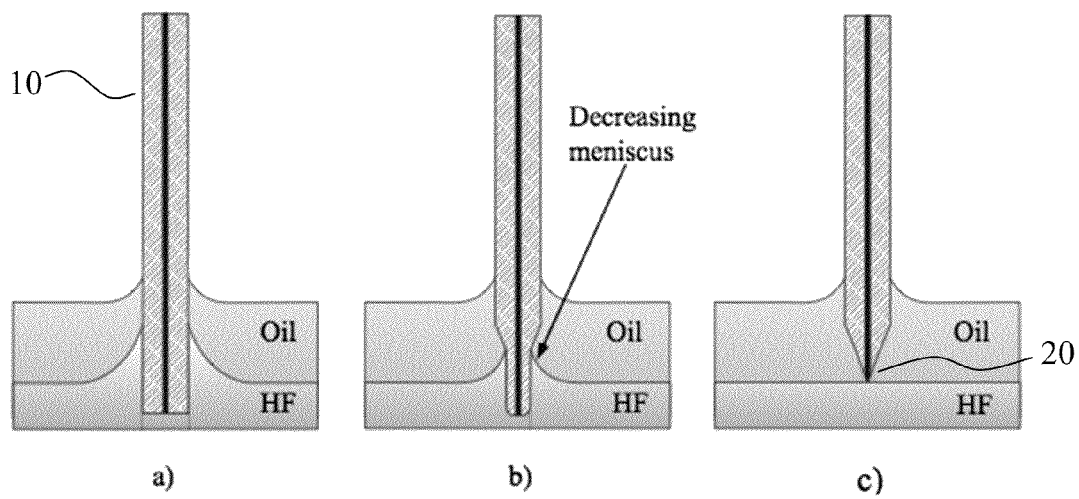
*FIG. 2*

THREE-DIMENSIONAL FRACTAL GRADUATED-BRANCHING HIERARCHICAL STRUCTURES AND FABRICATION METHOD THEREOF

CROSS-REFERENCE TO RELATED APPLICATIONS

This application claims the benefit of provisional patent application Ser. No. 61/545,495, filed on 2011 Oct. 10 by the present inventors.

STATEMENT REGARDING FEDERALLY SPONSORED RESEARCH OR DEVELOPMENT

Not applicable.

BACKGROUND

1. Field of the Invention

The present invention relates in general to the field of micro/nano-structures, and, more precisely, it relates to a method for developing fractal-branching, hierarchical structures that grow in a three-dimensional pattern.

2. Description of Prior Art

In nature, smart surfaces with highly desirable functionalities are abundant, and scientists are increasingly identifying them and delving into their exact composition in an attempt to emulate these functionalities artificially. Just a few examples include the following: a) the lotus leaf for its self-cleaning and water-repellent properties for use as coatings on buildings, windows, and solar cells; b) a gecko's toe hairs for its directional dry adhesion, in addition to its self-cleaning properties, as potential smart adhesives; and c) a shark's scales for its protection against biofouling and reduced drag to employ on ship hulls or enhanced performance swimsuits.

The examples given above are by no means an exhaustive list (e.g., consider the non-wetting surfaces of a beetle's back and a butterfly's wings, and the wet adhesion system of some insects' footpads or a frog tree's toes). While the exact morphology and material composition of the surfaces varies for all these cases, there are similarities among all of them. The most notable is the use of a hierarchy of structures from the macro- to nano-size scale. The research studies with a focus on the structural (as opposed to material) composition of the three particular examples given above, as well as the attempts to mimic these attributes artificially, are discussed in more detail below to illustrate the significant role that a structural hierarchy plays in achieving all these functionalities.

To this point, the lotus leaf, which has been studied extensively particularly in recent years, achieves its self-cleaning and water repellent properties in part from the morphology of its surface. Its surface consists of a combination of micro-sized bumps coupled with nano-sized hairs. Numerous methods have been employed to mimic this structure to achieve the same kind of superhydrophobicity including replication of an actual lotus leaf surface by molding it using poly(dimethylsiloxane) (PDMS) [Sun, et al., *Langmuir,* 2005]. However, further studies led to hypothesis and testing of the principles that the morphology played in achieving this superhydrophobic phenomenon. From this, it was determined that the use of micro-bumps covered with nano-hairs is actually what minimizes the surface contact with the water droplet (as opposed to solely the nano-hairs or micro-bumps) [Bhushan, et al., *Phil. Trans. R. Soc. A,* 2009]. Many artificial methods for generating these two-level hierarchical structures (the micro-bumps with nano-hairs) were formulated (e.g. see [Bhushan et al., US Patent No. 2010/0028604 A1, 4 Feb. 2010] and [Zhang, et al., International Patent No. WO 2009/002644 A2, 31 Dec. 2008]), and, it was also shown that the contact angle of a water droplet on the surface could also be manipulated systematically by varying the structure of the nano-sized structures on the micro-bumps [Jeong, et al., *Langmuir,* 2006]. Further understanding of the principal indicated that to obtain the dynamics of the water rolling easily off the surface required not only a large static contact angle but also a low contact angle hysteresis. This led to tailoring of surfaces to optimize this feature with extensions to larger temperature ranges for the generation of surfaces that resist ice formation [Mishchenko, et al., *ACS Nano,* 2010]. It should be noted that in this case, however, they only used one-level of micro-patterning the surface and just manipulated the shape or clumping tendencies of these one-level structures.

Similar scrutiny of the principles behind the dry adhesion properties of a gecko's toe surface and the reduced drag of a shark's skin has to lead to other surface manipulations in attempts to emulate these properties. In the case of the gecko hairs, dry adhesion is achieved due to van der Waals forces as the tips of the hairs make close contact with the surface to which they are sticking [Autumn, et al., *PNAS,* 2002]. This intimate contact, however, is accomplished in part due to the fractal nature of the tips of the hairs, which results in a graduated compliance from root to tip that allows good conformity. As was similarly discovered in the attempts to mimic the surface of a lotus leaf, the best performance in achieving the gecko-type adhesion came from structures with some sort of hierarchy [Lee, et al., *Langmuir,* 2009] but friction enhancement over a flat surface was also demonstrated with even a one-level patterned surface [Majidi, et al., *Phys. Rev. Letters,* 2006]. In the case of the shark's skin, the drag reduction comes from small riblet-shaped scales known as dermal denticles aligned in the fluid flow direction. An attempt to mimic this pattern for a high performance swimsuit has been also done. Again, a hierarchy between a wider weave and individual threads was used [Dean and Bhushan, *Phil. Trans. R. Soc. A,* 2010].

The principles of nanostructuring the surface of a material have been employed to advantage in other kinds of applications as well (aside from biomimetic ones) such as with metal oxides (e.g., nanostructuring of $TiO_2$ potentially enhances its photocatalytic activity [Zhu, et al., *J. Nanopart. Res.,* 2010] as is also the case with the free-standing metal oxide structures described in [Ren et al., International Patent No. WO 2004/050547 A2, 17 Jun. 2004]). Also nanowires, derived from gecko hair principals, have been used to create active-matrix circuitry for low-voltage, flexible artificial skin [Takei, et al., *Nature Materials,* 2010]. On the nanoscale alone, for electronic and light-related applications like solar cell arrays and light emitters/detectors, methods have been developed for growing tree-branched nanowires as shown in [Fonseca, et al., U.S. Pat. No. 7,528,060 B1, 5 May 2009] where the branched wires were formed by exposing a porous silicon wafer to a Transmission Electron Microscope (TEM) beam, in [Lee, et al., US Patent No. 2010/0084628 A1, 8 Apr. 2010] where parasitic branches are formed by a wet-etching process and/or thermal energy irradiation, and in [Samuelson, et al., U.S. Pat. No. 7,875,536 B2, 25 Jan. 2011] where nano-whiskers are induced from seeded catalytic particles via a VLS (Vapor-Liquid-Solid) method. However, it should be noted that all of the artificial attempts of biomimetic smart surfaces that were actually fabricated at most demonstrate a two-tier hierarchy (one micro-level and one nano-level) and thus lack the fractal branching structure and numerous hierarchical levels as witnessed, for instance, at the tips of real gecko hairs.

While methods for growing fractal-like branched nanowires on surfaces, (e.g., as shown in [Fonseca, et al.] and [Samuelson, et al.] described above) have been proposed for other applications, they have not been successfully applied to the fabrication of these biomimetic smart surfaces. Also, they have only been shown to grow on flat surfaces (and thus only formed a layer of structures on the nano-scale).

SUMMARY

Hence the objective of this invention is to provide a method to fabricate a hierarchical structure that grows in a three-dimensional pattern down to fractal-branching, nano-size level, while specifically presenting technical solutions for implementing the biomimetic smart surfaces previously discussed. Some of the distinguishing features of the structure and the fabrication process thereof are included in the following list. i) The micro-level to nano-level fractal-branching structures can be made from a single material (although the growth can be induced using other materials if desired) and the fractal-patterning is done in a one step process. ii) No addition of material is required for the formation of each branch. iii) The use of this technique eliminates the need for any sort of bonding step or adhesive material as well as any issues that result from bonding (e.g., delamination) that can arise when the surface is used in active applications such as adhesion. iv) The fractal patterning can be accomplished on a three-dimensional (i.e., non-planar) surface. v) The nano-level structures can be grown only where specified and the level of hierarchy controlled (e.g., the process can be stopped at small bumps or continued to form branching structures). vi) Other than the environment required for the focused particle beam, no special environmental conditions are needed (e.g., high temperatures or pressures) although they can be applied if, for instance, another material dictates it. Finally, vii) while all other incidents of fractal-patterning have been demonstrated on metals or semiconductors (metal oxides), this is first demonstration done on a solid insulator, i.e. silica, according to the best of the inventors' knowledge. Although this process is not limited to the use of this material, some of the advantages of a material like silica are that it is inexpensive, easily obtainable, and also easily etched (e.g., with a hydrofluoric acid solution) should it be desired to remove the structure such as in a molding application.

Unlike previous efforts at biomimetic smart surfaces, this same method is not specialized for a certain kind of surface and can be applied to fabricate many different types of surfaces from the non-wetting lotus-leaf kinds, gecko-like dry adhesion types, or sharkskin drag reduction ones. This is due in part to the fact that no specialized molds, etc. are required. Also, the micro and nano patterning steps are discrete yet the final entity is cohesively formed. Note that it can also be equally employed to advantage for other kinds of applications as well, for example but not limited to, electronic and light-related ones.

Even further objects and advantages will be apparent from the consideration of the following drawings and description.

BRIEF DESCRIPTION OF THE DRAWINGS

The characteristics and the advantages of the self-fabricated, graduated-branching, hierarchical and three-dimensional nano-structure and the method for fabricating the same, will be apparent from the following description, regarding particular embodiments thereof, which is made as a non-limiting example with reference to the attached drawings, wherein:

FIGS. 1a and 1b are the side view and top view respectively of Computer Aided Drawings (CAD) of a conical tip of a fiber with some grown graduated branches.

FIG. 2 is a sketch showing, from left to right, the dynamics of a tapered tip formation for a glass fiber dipped into an HF solution and covered by an organic over-layer (e.g., an oil).

FIG. 5e shows, in particular, more detail of the structure, achieved with the highest magnification, with a consequent formation of higher level graduated branches (at least a third level-hierarchy can be identified).

DETAILED DESCRIPTION OF THE INVENTION

Figure 3:
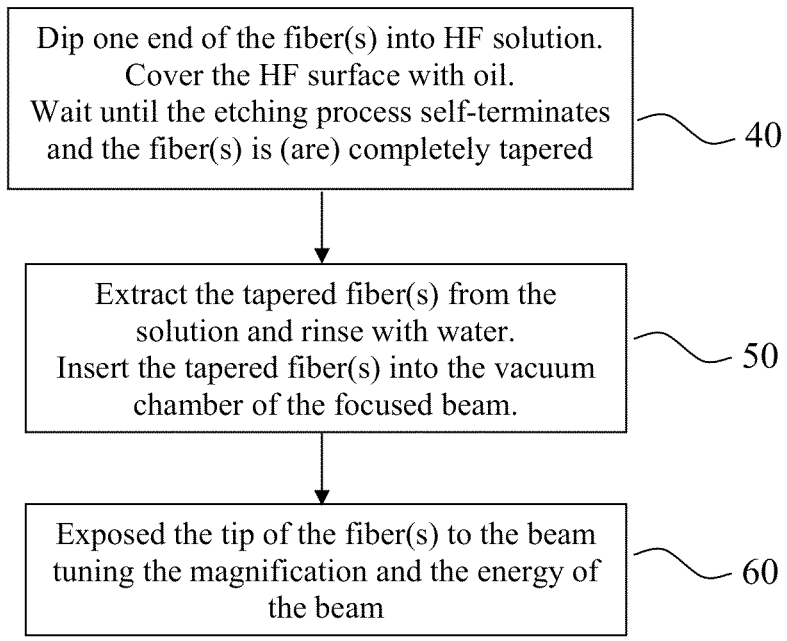
FIG. 3 is a flow chart summarizing a process for forming graduated branches on a three-dimensional structure.

According to one aspect of the invention, a method of growing a fractal-branching, hierarchical structure that grows in a three-dimensional pattern starts by tapering a silicon dioxide ($SiO_2$)-based structure (without precluding the possibility of using of other materials and shapes) into a topography offering a high degree of spatial orientation, e.g. conic tips. With reference to the mentioned drawings of the previous section, FIGS. 1a and 1b show two different views of a CAD model of a single tapered fiber with a graduated branching pattern. For the sake of clarity, it will be described here how to manufacture a single conic tip-substrate by using a commercial available and inexpensive structure like a glass fiber (e.g., a glass fiber normally used for optical communication, as is described in the present invention). It is then possible for those skilled in the art to determine how to gather together an array of those fibers in order to replicate the described method at a mass production level.

A convenient method to taper a $SiO_2$-based fiber structure 10 is based on etching glass fibers at the meniscus between hydrofluoric acid (HF) and an organic over-layer (a process known as the Turner method). FIG. 2 shows in particular the etching process carried out on a glass fiber for optical communication, which is consequently structured with a core and cladding, but this does not imply any difference in view of the invention here described. The etching bath self-generates a tip 20 on the fiber. The use of the etching process in the formation of the tip has been explained by [Hoffmann, et al., *Ultramicroscopy*, 61 (1995) 165-170]. The acid-oil-fiber interface determines the meniscus formed by the acid along the fiber. Due to the difference in surface tension between the protective layer and HF solution, a vertical gradient in the acid etching is created, which is responsible for the final "pencil" shape of the probe. Variation in the type of organic solvent influences the resulting tip geometry. The etching process can last, on average, from thirty minutes to one hour, depending on several variables (e.g., the kind of organic solvent used, diameter of the fiber, aqueous percentage of the HF solution, etc.). As a consequence of this process, a structure going from micrometric to nanometric size is formed, offering a three-dimensional structured substrate where it is possible to form graduated branches. Many glass fibers can be etched simultaneously, provided that enough space between the fibers is guaranteed in order for each of them to have an undisturbed bath and consequently the formation of a proper etching meniscus.

After the etching process is terminated, the glass fiber is extracted from the HF, rinsed with water to remove residual HF, and then placed in the vacuum chamber of a focused particle beam system. According to a preferred embodiment of the invention, said focused particle beam system is a Focused Ion Beam (FIB) microscope, but other systems such as a Transmission Electron Microscope (TEM), etc. could also be used.

By progressively scanning the fiber tip from the top or from at least two side orientations, branches spontaneously grow in a fractal-like fashion all over the substrate, i.e. pointing in any spatial direction. A partial scan can also be done, from either one or more directions, avoiding exposure of the entire surface to the beam, thus obtaining branches only on a desired part of the surface, according to the requirements of the particular application. On this first level of branches 30 (ref. to FIG. 1) a second level of graduated branches 31 can grow, and in turn those can host the formation of other smaller branches 32, and so on and so forth, finally resulting in a multi-level hierarchical structure of graduated branches similar to those found in trees in nature. The formation of the graduated branches is heavily dependent on the energy, focusing of the beam, and the number of scans (i.e., the fiber's exposure time to the beam). With ions accelerated by a voltage of 30 KV, and tuning the focus of the beam at a magnification ranging from 25 kx to 50 kx, the best results have been achieved. Typical currents range from 10 to 40 pA scanning over 400 to 50 square micron areas. At the proper beam energy and magnification the branch formation is basically instantaneous, taking less than 60 to 90 seconds. There is consequently no need for a prolonged scan sequence as claimed, e.g., in [Fonseca, et al., U.S. Pat. No. 7,528,060 B1, 5 May 2009].

In FIG. 3, a block diagram summarizing a simple method to produce a three-dimensional graduated branching structure is reported. The method is composed of three main steps: step 40 consists of tapering a glass fiber by dipping it into a HF solution and leaving it to etch for a pre-defined amount of time; in step 50 the tapered fiber is extracted from the HF bath and positioned in a focused beam machine to be scanned; finally in step 60 the generation of graduated branches occurs, by actively irradiating the tapered fiber with the focused beam.

As is clear from this synthesis of the invention, the formation of branches is a spontaneous, single-step process that forms on a single material-based substrate (and without the need to add any additional material).

Figure 4:
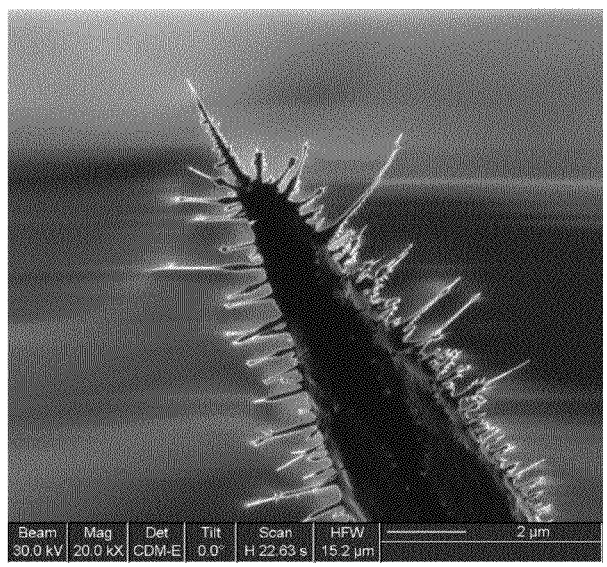
FIG. 4 is a FIB image of a tip of a tapered glass fiber with several branches grown all over the surface. At least two levels of branches can be distinguished.

FIG. 4 is a FIB image of a silica fiber that was tapered with the method shown in FIG. 2 and then progressively scanned with the FIB (according to the process described above and depicted in FIG. 3). As can be seen from the image, branched structures have formed all along the surface and at least two levels of branches can be distinguished.

Figure 5A:
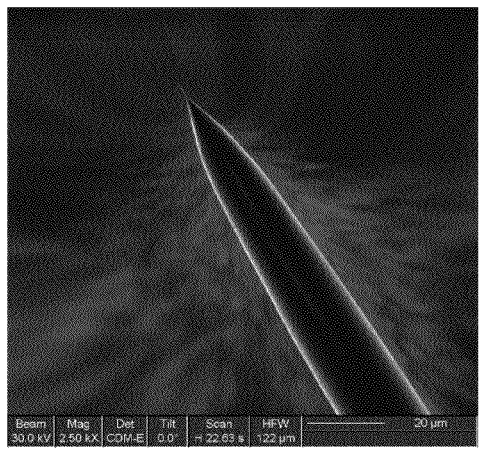
FIGS. 5a, 5b, 5c, 5d and 5e show a sequence of the formation of graduated branches over a three-dimensionally shaped glass substrate. By increasing the magnification (i.e. the focus of the beam) and the number of raster scans, it is clearly visible how the branches increase in number and in levels.
Figure 5B:
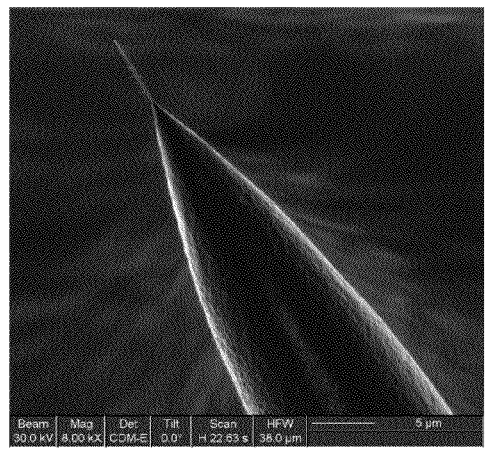
Figure 5C:
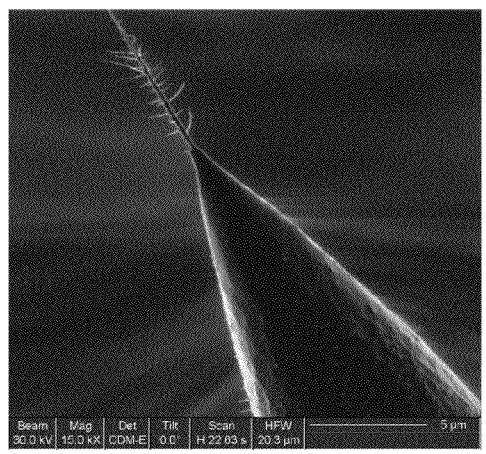
Figure 5D:
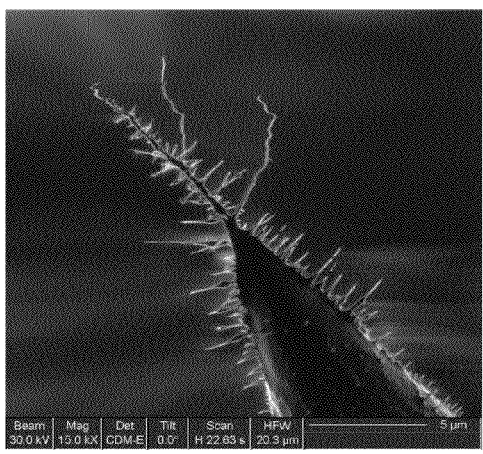
Figure 5E:
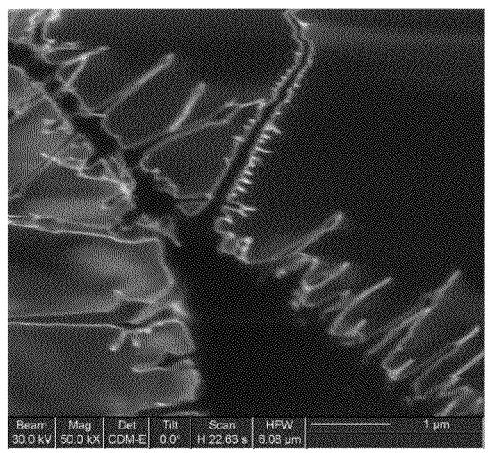

FIGS. 5a, 5b, 5c, 5d and 5e further illuminate this process by showing a sequence of the formation of graduated branches over the conic-tipped glass substrate. By increasing the magnification (i.e. the focus of the beam) and the number of raster scans, it is clearly visible from the series of FIB images how the branches increase in number and in levels. FIG. 5e shows, in particular, more detail of the structure, achieved with the highest magnification, with a consequent formation of higher level graduated branches (at least a third level-hierarchy in the nano-structures can be identified).

Figure 6:
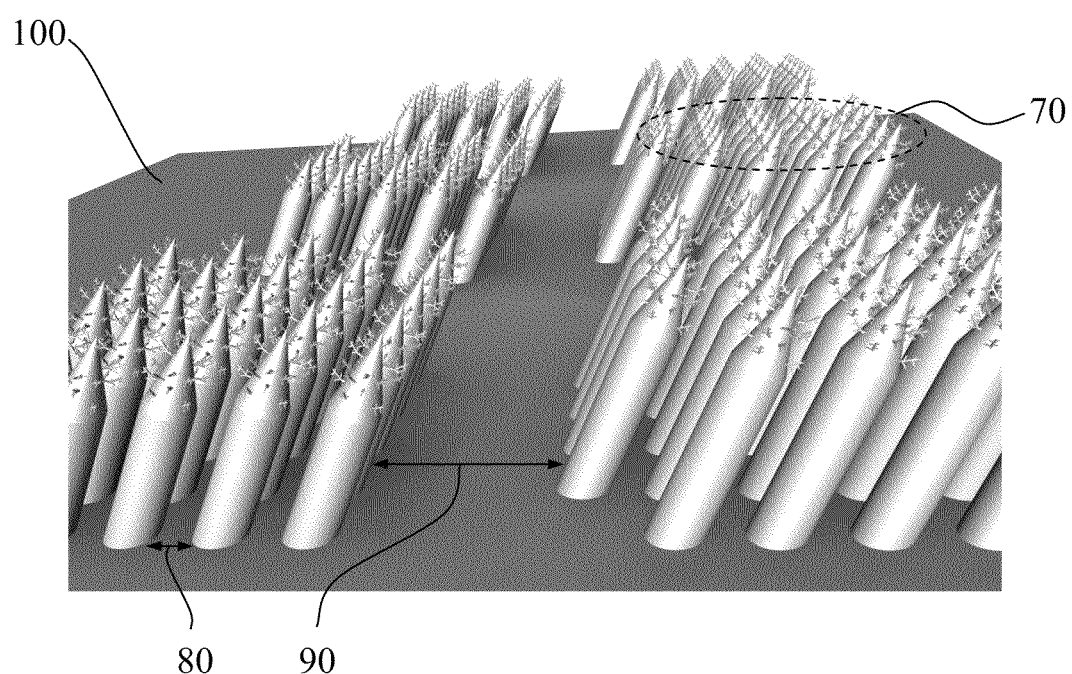
FIG. 6 shows a CAD model of a possible concept of mass production of graduated branching structures in a pattern resembling a gecko's toe hairs for an application of dry adhesion.

FIG. 6 shows a CAD model of a general m×n array of bunches 70 over a substrate 100, each of said bunches composed of p×q fiber-structures with graduated branches as shown in FIG. 1. As it will be obvious to those skilled in micro/nano-technology, the array can be reproduced in any combination of the parameters m, n, p, q, and of the gaps 80 between the fibers and of the gaps 90 between the bunches 70, according to the need and the capability of the mass production process. Furthermore, these combinations of m×n bunches of p×q fiber structures can be further integrated on surfaces with an existing hierarchy of structures from the millimeter (or larger) to micrometer scale. In a preferred embodiment, the parameters m, n, p, q and the gaps 80 between fibers and 90 between bunches could resemble the structure of the gecko foot, in view of producing smart surfaces for dry-adhesion.

In order to reach the array structure shown in FIG. 6, the following process could be followed, for sake of example. P×q fibers can be tapered stand-alone and then grouped tightly together in a substrate 100. Alternatively, the new fibers can be disposed in a thermo-shrinking extruded plastic substrate leaving a few millimeters of distance between the fibers, in order to allow each fiber to have an undisturbed HF-etching bath and the formation of a proper meniscus (ref. to FIG. 2). After the etching process is completed, the substrate can be heated so that it shrinks resulting in the fibers coming closer together and thus the array denser. For a dry adhesion application, the fibers should have a specific known angle with respect to the substrate's surface, as is shown in FIG. 6.

At this point the substrate with the fibers and the graduated branches can work as the positive mold for molding several m×n bunches 70 by means of, for instance, suitable soft polymeric materials typically used for reproducing nanosized features by molding, e.g., (but without precluding the use of other materials or molding techniques) polyurethane, PDMS or perfluoropolyether (PFPE)-based elastomers.

Once the negative mold is cured (by thermal treatment, and/or UV, etc.), the original positive glass mold is gently extracted and its inner glass residuals that can remain in the formed negative mold, can be removed by injecting HF inside and eventually applying a vacuum.

The newly formed negative mold can be used to form structures with graduated branches as depicted in FIG. 6, by pouring in (or by melting in through the suitable use of heat and pressure) the negative mold suitable materials, e.g., (but without precluding the use of other materials or techniques) PDMS, PFPE, polypropylene or polyethylene, in accordance with the material used to develop the negative mold. Polypropylene or high-density polyethylene, for example, is particularly indicated for generating surfaces with dry-adhesion features due to similarities in their elastic modulus to natural gecko arrays. In order to reduce the wear dynamics additional additives and/or material combinations could be added.

Another possible application of the invention relates to fluid delivery at a micro/nano scale. The branched fiber structure in glass can be coated by a suitable material through, for example, dipping, sputtering or evaporation. After the coating process, the glass structures can be etched away by HF, thus leaving a hollow branched structure, whose walls consist of the coating itself. (This resulting structure could also be used as a mold.) A similar array as shown in FIG. 6 consisting of hollow branched structure can be created. In this case, gaps 80 and 90 can be filled with foam or another suitable material if needed. Both passive and active delivery of fluid(s) through these micro- or nano-hollow branches can be exploited, in order, for example, to achieve surfaces with wet-adhesion characteristics, biomimicking, for instance, the features of an insect's footpad or a tree frog's toe pad, which is known to secrete fluid for adhesion purposes where the secretion method is passively regulated by capillary forces as explained by J. H. Dirks and W. Federle [J. H. Dirks and W. Federle, *J. R. Soc. Interface,* 2011] and B. N. J. Persson [Persson, *IOP Condens. Matter,* 2007].

An additional method to create the array of fibers or other kinds of micro shapes (such as but not limited to sharkskin dermal denticles or butterfly wing flaps) is to apply, for instance, deep reactive ion etching (DRIE), directly on a substrate, made in glass (or silicon) for instance. The surface of the substrate can be perpendicular to the ion beam of the DRIE or skewed, in order to form fibers or other kinds of micro shapes skewed with respect to the substrate (as it is optimal for a dry adhesion application). The DRIE process can generate an array of fibers or pillars that can afterwards be automatically milled in the FIB microscope by using a highly energetic and highly focused beam, in order to round the tip of the fibers, for example to form a hemispherical or, more simply, a conical tip as in FIG. 1, so as to finally have a surface offering the possibility to grow branches in any direction in space, e.g., in a three-dimensional way. At this point, the same structure shown in FIG. 6, but still without the graduated branches, can be processed in the FIB in order to spontaneously grow the graduated branches on top (or wherever else the nano structures are desired) of each tapered fiber or other micro shape.

Modifications and/or changes may be made to the three-dimensional graduated fractal branching structures according to the present invention and method thereof, without departing from the protection domain of the general inventive concept as defined by the appended claims.

The invention claimed is:

1. A method of developing branching structures, characterized in that it develops graduated branched structures featuring dimensions from the macro to nano level and that it comprises the following steps:
    providing a structure(s) featuring dimensions from macro to micro level such as a fiber-like structure(s) (10);
    completely or partially exposing said provided structure to the scan of a focused particle beam with suitable enemy and focus, said particle beam causing the spontaneous growth of cohesive fractal graduated hierarchical branches (30) (31) (32), to multiple hierarchy, and spatially oriented in one or more directions, i.e. three-dimensionally, and featuring dimension down to, at least, the nano level.

2. A method according to claim 1, wherein said structures such as fiber-like structures (10) are stand-alone structures or are generated directly on a substrate by a process selected from, but not limited to, chemical etching, ion etching and/or laser ablation.

3. A method according to claim 2, wherein said structures such as fiber-like structures (10) are tapered in order to have a surface offering a three-dimensional spatial orientation.

4. A method according to claim 2, wherein said structures such as fiber-like structures (10) are made in glass.

5. A method according to claim 4, wherein said glass structures such as fiber-like structures (10) are etched in an HF bath resulting in self-tapered structures (20).

6. A method according to claim 1, wherein said structures such as fiber-like structures (10) are completely or partially exposed to the scan of a focused particle beam with suitable energy and focus (for example, but not limited to, FIB, SEM, TEM, LASER), said particle beam causing the spontaneous growth of cohesive fractal graduated hierarchical branches (30) (31) (32), to multiple hierarchy, and spatially oriented in one or more directions, i.e. three-dimensionally, and featuring dimension down to, at least, the nano level.

7. A method according to claim 1, wherein the graduated branched structures are formed in a m×n array of bunches (70) on a substrate (100), each of said bunches composed of p×q graduated branched structures.

8. A method according to claim 7, wherein the m×n array of bunches (70) on a substrate (100), is used as a positive mold for generating negative mold(s) in order to replicate the graduated branched structures.

9. A method according to claim 8, wherein said replicated graduated branched structure are developed in a material particularly suitable for applications of dry-adhesion.

10. A method according to claim 8 wherein the graduated branched structures or replicated graduated branched structures are developed as suitable for other kinds of biomimetic or non-biomimetic applications such as but not limited to non-wetting, drag reducing, electronic, or light capturing/emitting applications.

11. A method according to claim 8, wherein the graduated branched structures or replicated graduated branched structures can be coated by dipping in, sputtering, evaporation, (or other suitable process) a specific material.

12. A method according to claim 11, wherein after the coating process the graduated branched structures can be extracted and/or etched away, thus leaving hollow graduated branched structures, whose walls consist of said coating itself.

13. A method according to claim 12, wherein the micro- to nano-hollow branches are used for passive and/or active delivery of one or more fluids.

14. A method according to claim 13, wherein foam or another suitable spongy material is filed in between gaps (80) and (90) in order to flatten the surface, biomimicking the features of an insect's foot pad or a tree frog's toe pad, which exhibit wet-adhesion capability.

* * * * *